April 14, 1942. H. FUCHS 2,279,308
FRICTION SHOCK ABSORBING MECHANISM
Filed Feb. 24, 1941 3 Sheets-Sheet 2
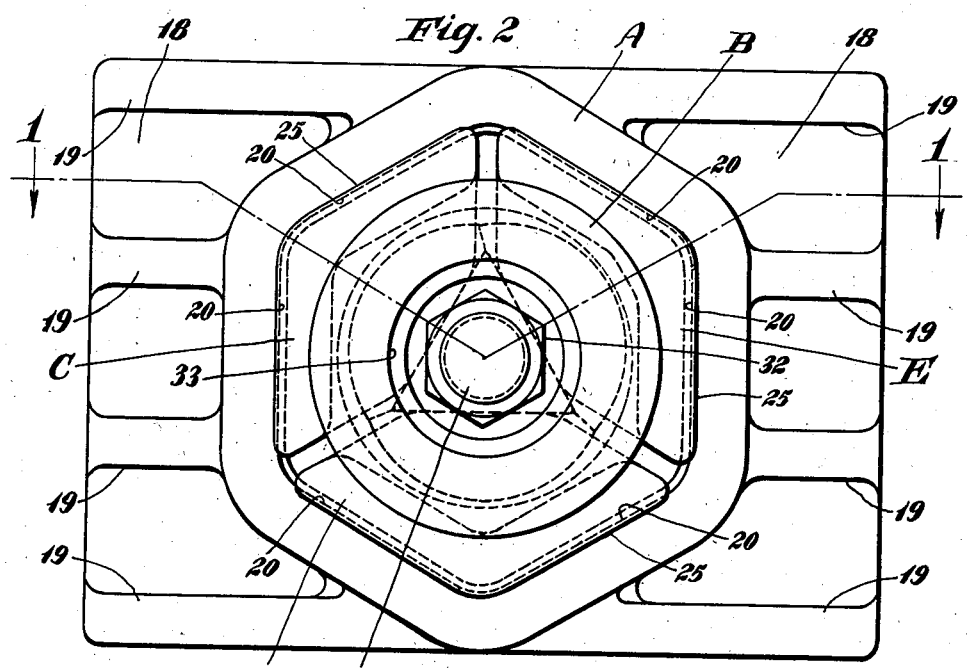
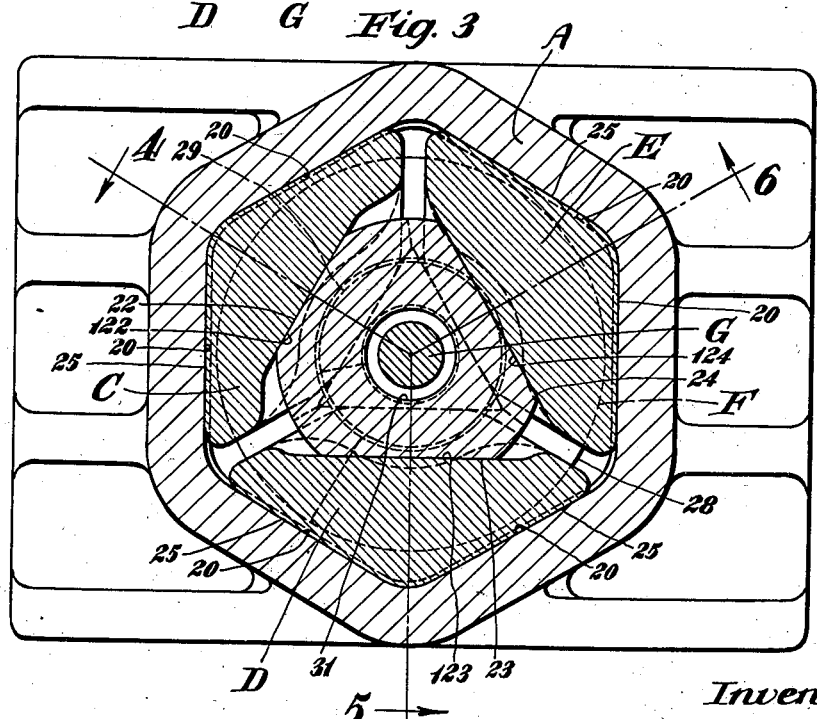
Inventor
Henry Fuchs

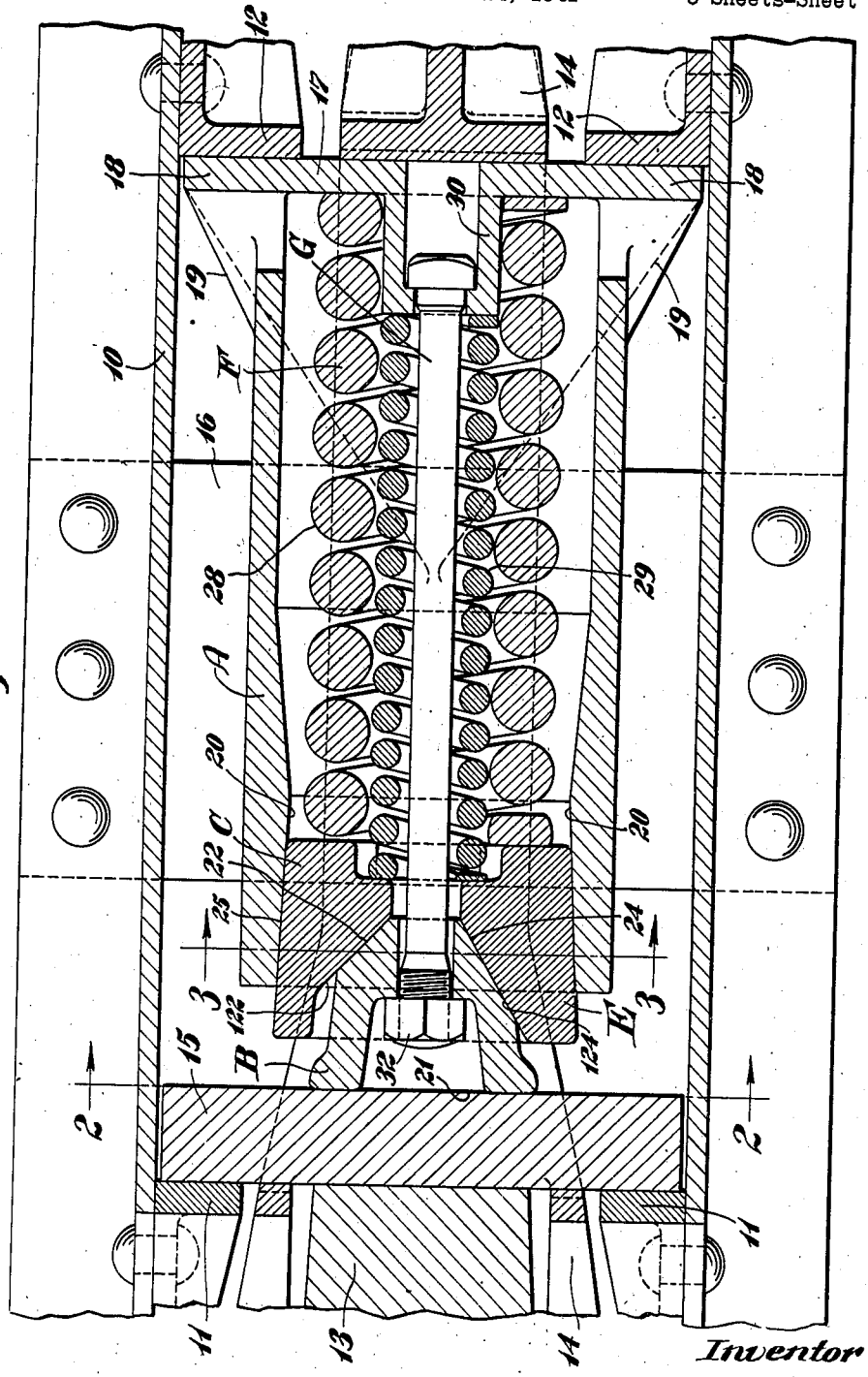

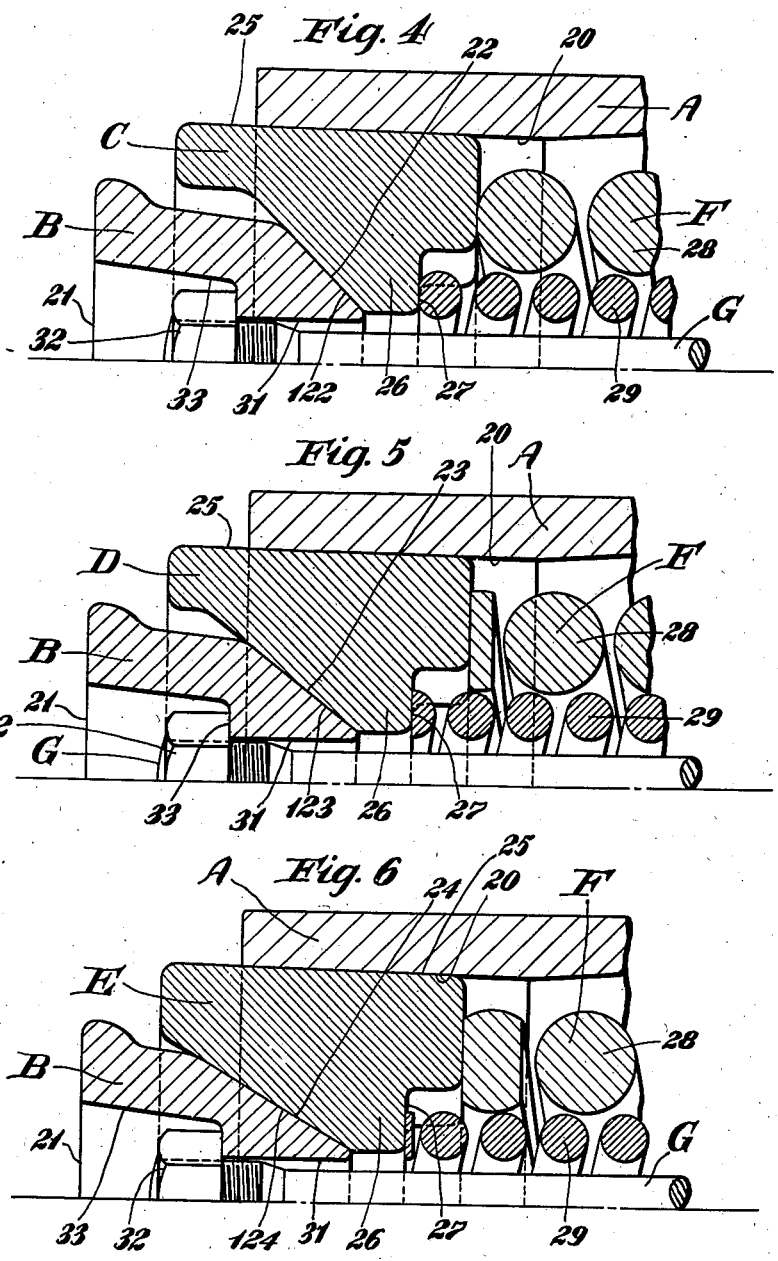

Patented Apr. 14, 1942

2,279,308

UNITED STATES PATENT OFFICE 2,279,308

FRICTION SHOCK ABSORBING MECHANISM

Henry Fuchs, Chicago, Ill., assignor to W. H. Miner, Inc., Chicago, Ill., a corporation of Delaware Application February 24, 1941, Serial No. 380,386

19 Claims. (Cl. 213—32)

This invention relates to improvements in friction shock absorbing mechanisms especially adapted for railway draft riggings.

More specifically my invention relates to friction shock absorbing mechanisms wherein are employed a wedge friction system including a friction casing and a friction clutch cooperating with the casing, movement of the clutch with respect to the casing being spring resisted, and the clutch comprising a wedge pressure transmitting element and cooperating friction shoes.

One object of my invention is to provide a friction shock absorbing mechanism comprising a friction casing, a friction clutch slidable within the casing, and a spring resisting movement of the clutch inwardly of the casing, wherein the friction clutch includes a central wedge pressure transmitting member and a plurality of friction shoes surrounding the wedge member, the wedge member having wedging engagement with each of the shoes, the wedging engagement being at keen and blunt angles with respect to the longitudinal central axis of the mechanism with respect to certain of the shoes to assure high capacity in compression and facilitate quick releasing action when the actuating pressure is reduced, and wherein the wedging engagement between the wedge and the remaining shoe or shoes is at an angle or angles less than said blunt and greater than said keen angles to neutralize and blend the action of the blunt and keen shoes.

A more specific object of the invention is to provide a simple and efficient friction shock absorbing mechanism comprising a friction casing, a friction clutch slidable within the casing, and a spring resistance within the casing yieldingly opposing inward movement of the clutch, wherein the clutch comprises a central pressure transmitting wedge block and three shoes surrounding the block, the shoes having frictional sliding engagement with the casing and the wedge having three wedge faces inclined with respect to the longitudinal central axis of the casing, each differing in angularity with respect to the remaining wedge faces of said wedge, said wedge faces of the wedge engaging correspondingly inclined wedge faces on the shoes respectively.

A still further object of the invention is to provide a mechanism as set forth in the preceding paragraph, wherein the cooperating wedge faces of the wedge and one of the shoes are disposed respectively at a keen wedging angle with respect to the longitudinal central axis of the mechanism, the cooperating wedge faces of the wedge and another of said shoes are disposed at a relatively blunt releasing angle with respect to said axis, and the cooperating wedge faces of the wedge and the remaining shoe are disposed at an angle to said axis which is less than said blunt and greater than said keen angle.

Other objects of the invention will more clearly appear from the description and claims hereinafter following.

In the drawings forming a part of this specification, Figure 1 is a horizontal longitudinal sectional view through the underframe of a railway car, illustrating my improved friction shock absorbing mechanism in connection therewith, the section through the shock absorbing mechanism proper at the wedge and friction shoe end thereof being taken on two intersecting planes at 120° to each other and corresponding substantially to the line 1—1 of Figure 2. Figure 2 is a front elevational view, on an enlarged scale, of the shock absorbing mechanism only, shown in Figure 1, looking in the direction of the line 2—2 of Figure 1. Figure 3 is a transverse vertical sectional view, corresponding substantially to the line 3—3 of Figure 1. Figures 4, 5, and 6 are transverse sectional views, corresponding respectively to the lines 4—4, 5—5, and 6—6 of Figure 3.

In said drawings, 10—10 designate spaced channel-shaped center or draft sills of a railway car underframe structure, to the inner sides of which are secured front and rear stop lugs 11—11 and 12—12. The inner end portion of the coupler shank is designated by 13 and a hooded yoke 14 of well-known design is connected thereto. My improved shock absorbing mechanism proper and a front main follower 15 are disposed within the yoke, and the yoke, in turn, is supported by a detachable saddle plate 16 fixed to the bottom flanges of the sills 10—10.

My improved shock absorbing mechanism comprises broadly a combined friction shell and spring cage in the form of a casing A; a wedge B; three friction shoes C, D, and E in wedging engagement with the wedge B, the angles of wedging engagement respectively of the shoes with the wedge varying in degree; a main spring resistance F; and a retainer bolt G.

The casing A, which forms the combined friction shell and spring cage, is of substantially hexagonal cross section, having the friction shell section formed at the forward end and the spring cage section at the rear end thereof. The casing is closed at the rear end by a transverse wall 17 which is extended laterally outwardly, thereby providing flanges 18—18 which cooperate with the rear stop lugs 12—12 in the manner of the usual rear follower. The flanges 18—18 are preferably reenforced by webs 19—19 formed integral with the walls of the casing A and said flanges 18—18. The friction shell section of the casing A is provided with six interior, substantially flat, inwardly converging friction surfaces 20—20 which are arranged symmetrically about the longitudinal central axis of the mechanism.

The wedge B is in the form of a block having a transverse outer end face 21 bearing on the inner face of the front follower 15. At its inner end the wedge block B has three inwardly converging, flat wedge faces 22, 23, and 24, arranged about the central longitudinal axis of the mechanism. The wedge face 24 is disposed at a relatively keen wedging angle with respect to said longitudinal axis and the wedge face 22 is disposed at a relatively blunt releasing angle with respect to said axis. The wedge face 23, as shown in the drawings, is preferably disposed at an angle which is of a degree of inclination intermediate the angles of the faces 22 and 24.

The three shoes C, D, and E are of similar design, except as hereinafter pointed out. Each shoe is provided with an outer friction surface 25 of V-shaped cross section extending lengthwise of the mechanism, the two angularly disposed faces of the V-shaped surface being substantially flat and engaging respectively two adjacent friction surfaces 20—20 of the casing. On the inner side each shoe has a lateral enlargement 26 provided with a flat wedge face, correspondingly inclined to, and cooperating with, one of the flat wedge faces of the wedge block B. The wedge faces of the three shoes C, D, and E, which are respectively indicated by 122, 123, and 124, engage respectively with and are correspondingly inclined to the wedge faces 22, 23, and 24 of the wedge B. It will thus be evident that the shoe C is provided with a relatively blunt wedge face, and the shoe E with a relatively keen wedge face, while the shoe D is provided with a wedge face which is blunter than the wedge face of the shoe E and keener than that of the shoe C.

Each shoe has an inset shoulder 27 at the inner end of the enlargement 26 thereof, forming a seat member for the inner coil of the main spring resistance, as hereinafter pointed out.

The main spring resistance F comprises a relatively heavy outer coil 28 and a lighter inner coil 29 interposed between the rear end of the casing A and the inner ends of the shoes C, D and E, the rear end of the spring 28 bearing directly on the wall 17 of the casing and the front end thereof bearing on the inner ends of the shoes. The inner coil spring 29 bears at its front end on the seats 27—27—27 of the three shoes and has its rear end bearing on an inwardly projecting boss 30 on the rear wall 17 of the casing.

The retaining bolt G, which serves to hold the mechanism assembled and of uniform overall length, has a head at the rear end thereof which is anchored in the boss 30 of the rear wall of the casing A. The shank of the bolt extends through an opening 31 in the block B. The block is anchored to the bolt by means of a nut 32 threaded on the outer end of said bolt and seated in a pocket 33 of the block B.

In this art various capacities of friction shock absorbing mechanisms are required for different types of service and by varying the taper of the friction casing and the angularity of the wedge faces of the wedge and friction shoes of my improved friction shock absorbing mechanism different capacities are obtained, that is, by providing a minimum of taper of the casings and relatively great angles of inclination of the wedge faces on the wedge and shoes, mechanisms of relatively soft shock absorbing capacity are produced, and by increasing the taper of the casing and decreasing the angles of inclination of the wedge faces on the wedge and shoes mechanisms of increasingly higher shock absorbing capacity are provided. To obtain these results the taper of the casing may be varied between $\frac{3}{32}$ of an inch and $\frac{1}{4}$ of an inch in six inches in length for each friction surface, that is, a reduction in diameter from $\frac{7}{16}$ of an inch to $\frac{1}{2}$ of an inch from the forward end of the friction shell section of the casing to the inner end thereof when the shell friction surfaces are six inches long. The wedge faces on the coacting wedge B and shoes C, D, and E may be varied as follows: 25° to 40° for the keen faces 24 and 124; 30° to 45° for the faces 23 and 123; and 35° to 50° for the blunt faces 22 and 122. The figures given are those found to be preferred, but I am aware from experiments conducted that variations from these figures are permissible and still obtain an efficient mechanism.

As is well known to those skilled in this art, the exact action which takes place in a mechanism of this character is difficult to describe specifically, and furthermore a certain action may take place when the mechanism is compressed slowly as in a Riehle machine and a different action when tested under a drop hammer. Inasmuch as the drop hammer test more nearly reproduces the quick action under switching conditions which ordinarily takes place in a draft rigging mounted on a car, I will now describe the operation as it occurs under the drop hammer.

In the operation of my improved friction shock absorbing mechanism, the yoke 14 pulls the casing A forwardly during a draft or pulling action, compressing the mechanism against the front follower 15, which at this time is held stationary by engagement with the front stop lugs 11—11. During buffing action the front follower 15 is forced rearwardly by the coupler and the shock absorbing mechanism compressed between the front follower 15 and the rear stop lugs 12—12, the casing A being held stationary by engagement with said stop lugs. During compression of the mechanism, the clutch, comprising the block B and the three friction shoes C, D, and E, is forced inwardly of the casing A against the resistance of the springs 28 and 29. At the same time a wedging action is set up between the cooperating wedge faces of the block B and the shoes C, D, and E, spreading the shoes apart, thereby expanding the friction clutch and forcing the friction surfaces of the shoes into intimate frictional contact with the friction surfaces of the casing. During the wedging action, there is initially a slight movement of the wedge B inwardly with respect to the keen angled shoe E, evidently due to the inertia of the shoe and the fact that, on account of the relatively keen angle, slippage on the wedge faces 24 and 124 is possible. During this initial action, the blunt angled shoes C and D will move longitudinally inwardly of the casing A, substantially in unison with the wedge B, on account of the relatively non-wedging angle of the cooperating faces 22 and 122, and the relatively blunt angle of the cooperating faces 23 and 123, thus advancing the shoes C and D longitudinally slightly ahead of the keen angle shoe E. The forgeoing described initial action sets up the desired pronounced wedging and spreading action. As the parts continue their movement inwardly of the casing, further slippage between the keen angle faces 24 and 124 is substantially nil, but due to the taper of the casing friction surfaces there must be relative approach of the shoes, which is permitted by the shoes C and D moving radially inwardly with respect to the wedge B, the slippage occurring primarily on the blunt angle faces 22 and 122 and the lesser blunt faces 23 and 123, which act as a sort of safety device for this purpose. This differential action further advances the shoes C and D longitudinally ahead of the shoe E, the blunter angled shoe C advancing more rapidly than the shoe D, and the action so continues until the end of the compression stroke. The friction casing A, being of metal, is capable of a limited amount of radial expansion which takes place during compression of the mechanism. With the degree of taper employed the expansion cannot neutralize the taper thereof and a differential action is assured. In this connection it is pointed out that the wedging and non-wedging actions of the shoes C and E are, in effect, neutralized by the shoe D, thereby assuring smooth action of the mechanism during both compression and release. Upon reduction of the actuating or compressing force, there is an initial releasing action induced by the radial inward contraction of the casing. These forces produce a relative approach toward the center line of the mechanism of all three shoes, and this, in turn, causes the pressure transmitting wedge B to be squeezed out from between the shoes, said action being facilitated by reason of the blunt faces 22 and 122 and the less blunt faces 23 and 123 on the wedge and blunt shoes C and D, respectively, it being observed that these faces now act substantially as true wedge faces with respect to the radial inward contracting forces. In release the shoe C initiates the action followed by the shoe D. The contraction of the casing continues until the casing has either resumed its normal condition or until the contracting forces have been reduced to a point where the stored up energy in the spring exceeds the longitudinal resistance against release of the same. The initial releasing action hereinbefore described results in loosening the wedge B sufficiently to permit the reduction of the pressure between the friction surfaces of the various shoes and casing friction surfaces, whereupon the spring becomes effective to commence moving all of the friction shoes outwardly of the casing. This outward movement continues until the wedge B is limited against further movement by the bolt G. The three shoes will thus be forced into their initial normal position.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell; of a pressure transmitting wedge member; a plurality of friction shoes, consisting of more than two, surrounding said wedge member and having frictional sliding engagement with the interior of the shell, said wedge and each of said shoes having a cooperating pair of engaging wedge faces, the cooperating pair of wedge faces of each shoe and the wedge being inclined at an angle to the longitudinal central axis of the mechanism different from the angle of the cooperating faces of the wedge and each of the remaining shoes; and a spring resistance opposing inward movement of the shoes with respect to the shell.

2. In a friction shock absorbing mechanism, the combination with a friction shell having inwardly converging interior friction surfaces; of a pressure transmitting wedge member; a plurality of friction shoes, consisting of more than two, surrounding said wedge member, each shoe having a friction surface slidably engaging a friction surface of said shell, said wedge and each of said shoes having a cooperating pair of wedge faces, the cooperating pair of wedge faces of each shoe and the wedge being inclined at an angle to the longitudinal central axis of the mechanism different from the angle of the cooperating pairs of faces of the wedge and each of the remaining shoes; and a spring resistance opposing inward movement of the shoes with respect to the shell.

3. In a friction shock absorbing mechanism, the combination with a friction shell having interior friction surfaces; of a pressure transmitting wedge member; a plurality of friction shoes, consisting of more than two, surrounding said wedge member and having friction surfaces in sliding contact with the shell friction surfaces, said wedge and each of said shoes having a cooperating pair of engaging wedge faces, the cooperating pair of wedge faces of each shoe and the wedge being inclined in lengthwise direction with respect to the friction surface of the shell which cooperates with said shoe at an angle different from the angles of the cooperating faces of the wedge and each of the remaining shoes; and a spring resistance opposing inward movement of the shoes with respect to the shell.

4. In a friction shock absorbing mechanism, the combination with a friction shell having interior friction surfaces extending lengthwise of the mechanism; of a pressure transmitting wedge member; and a plurality of friction shoes, consisting of more than two, surrounding said wedge member, each of said shoes having a friction surface extending lengthwise of the mechanism slidably engaging one of said shell friction surfaces, said wedge and each shoe having a pair of engaging wedge faces inclined at an angle to the shell friction surface with which said shoe engages, said angle of inclination of the cooperating wedge faces of each shoe and the wedge being different from the angle of inclination of the pairs of wedge faces of the wedge and each remaining shoe.

5. In a friction shock absorbing mechanism, the combination with a friction shell; of a pressure transmitting wedge member having a plurality of wedge faces, each of said wedge faces being inclined at an angle to the longitudinal axis of the mechanism, the angle of inclination of one of said faces being different from the angle of inclination of another of said wedge faces, and also different from still another of said wedge faces; a plurality of friction shoes, said shoes corresponding in number to the wedge faces of said wedge, each shoe having sliding frictional engagement with the shell, and each shoe having a wedge face engaging one of said wedge faces of the wedge and correspondingly inclined to said wedge face of the wedge; and a spring resistance opposing inward movement of the shoes with respect to the shell.

6. In a friction shock absorbing mechanism, the combination with a friction shell having interior friction surfaces; of a pressure transmitting wedge member having a plurality of wedge faces; a plurality of friction shoes surrounding said wedge member, said shoes corresponding in number to the wedge faces of said wedge, each shoe having a friction surface engaging a friction surface of the casing, and a wedge face engaging one of the wedge faces of the wedge, the wedge face of each of said shoes being inclined in a direction lengthwise of the mechanism with respect to the friction surface of the shell engaged by said shoe, the angles of inclination of the wedge faces of at least three of the shoes with respect to the friction surfaces engaged by said shoes, respectively, being all different from each other; and a spring resistance opposing inward movement of the shoes with respect to the casing.

7. In a friction shock absorbing mechanism, the combination with a friction shell; of a pressure transmitting wedge member; a plurality of friction shoes surrounding said wedge member and having frictional sliding engagement with the interior of the shell, said wedge and each of said shoes having a cooperating pair of wedge faces, the cooperating pair of wedge faces of one of said shoes and the wedge being disposed at a relatively keen wedging angle with respect to the longitudinal axis of the mechanism, the cooperating pair of wedge faces of another of said shoes and the wedge being disposed at a relatively blunt angle with respect to said longitudinal axis, and the cooperating pair of still another of said shoes being disposed at an angle to said longitudinal axis which is greater than said keen angle and less than said blunt angle; and a spring resistance opposing inward movement of the shoes with respect to the shell.

8. In a friction shock absorbing mechanism, the combination with a friction shell having inwardly converging interior friction surfaces; of a pressure transmitting wedge member; a plurality of friction shoes surrounding said wedge member, each shoe having a friction surface slidably engaging a friction surface of said shell, said wedge and each of said shoes having engaging wedge faces, said wedge having keen angled wedging engagement with one of said shoes, blunt angled wedging engagement with another of said shoes, and wedging engagement with still another of said shoes which is blunter than said keen angle and keener than said blunt angle; and a spring resistance opposing inward movement of said shoes with respect to the shell.

9. In a friction shock absorbing mechanism, the combination with a friction shell; of a pressure transmitting wedge member; three friction shoes surrounding said wedge member and having frictional sliding engagement with the interior of the shell, said wedge and each of said shoes having a cooperating pair of engaging wedge faces, the cooperating pair of wedge faces of two of said shoes and the wedge being inclined at angles to the longitudinal central axis of the mechanism different from each other and different from the angle of the cooperating faces of the wedge and the remaining shoe; and a spring resistance opposing inward movement of the shoes with respect to the shell.

10. In a friction shock absorbing mechanism, the combination with a friction shell having inwardly converging, interior, friction surfaces; of a pressure transmitting wedge member; three friction shoes surrounding said wedge member, each shoe having a friction surface engaging a friction surface of said shell, said wedge and each of said shoes having a cooperating pair of wedge faces, the cooperating wedge faces of the wedge and one of said shoes being disposed at an angle to said longitudinal axis which is greater than the angle of inclination of cooperating wedge faces of the wedge and one of the remaining shoes and less than that of the cooperating wedge faces of the wedge and the other remaining shoe; and a spring opposing relative sliding movement of the shoes and friction shell.

11. In a friction shock absorbing mechanism, the combination with a friction shell having interior friction surfaces; of a pressure transmitting wedge member; three friction shoes surrounding said wedge member and having friction surfaces in sliding contact with the shell friction surfaces, said wedge and each of said shoes having a cooperating pair of engaging wedge faces, the cooperating pair of wedge faces of each shoe and the wedge being inclined in lengthwise direction at an angle with respect to the friction surface of the shell which cooperates with said shoe, said angle being different from the angles of the cooperating faces of the wedge and each of said remaining two shoes; and a spring resistance opposing inward movement of the shoes with respect to the shell.

12. In a friction shock absorbing mechanism, the combination with a friction shell having interior friction surfaces; of a series of friction shoes arranged around the central longitudinal axis of the shell; a spring resistance; and spreader means cooperable with said shoes, said shoes and spreader means having a plurality of cooperating sets of faces, one set of which is arranged at a relatively keen wedging angle, another set of which is arranged at a relatively blunt nonwedging angle, and a third set of which is arranged at a wedging angle between said blunt and keen angles.

13. In a friction shock absorbing mechanism, the combination with a friction column member; of a pressure transmitting wedge member; a plurality of friction shoes consisting of at least three, interposed between said wedge member and friction column, said wedge and each of said shoes having a cooperating set of engaging wedge faces, the cooperating set of wedge faces of each shoe and the wedge being inclined at an angle to the longitudinal axis of the mechanism different from the angle of the cooperating set of faces of the wedge and each of the remaining shoes; and a spring resistance opposing lengthwise movement of the shoes with respect to the column member.

14. In a friction shock absorbing mechanism, the combination with a friction column having longitudinally extending friction surfaces inclined to the longitudinal axis of the mechanism; of a pressure transmitting wedge member; a plurality of friction shoes, comprising at least three, interposed between said wedge and column, each shoe having a friction surface slidably engaging one of the friction surfaces of the column, said wedge and each shoe having a cooperating set of wedge faces, the cooperating set of wedge faces of each shoe and the wedge being inclined at an angle to the longitudinal axis of the mechanism different from the angle of the cooperating set of faces of the wedge and each of the remaining shoes; and a spring resistance opposing lengthwise movement of the shoes with respect to the column.

15. In a friction shock absorbing mechanism, the combination with a friction column having longitudinally extending friction surfaces; of a pressure transmitting wedge; a plurality of friction shoes, comprising at least three, interposed between said wedge and column, and having friction surfaces in sliding contact with the column friction surfaces, said wedge and each of said shoes having a cooperating set of engaging wedge faces, the cooperating set of wedge faces of each shoe and wedge being inclined in lengthwise direction with respect to the friction surface of the column which cooperates with said shoe, said inclination of the set of wedge faces of the wedge and each shoe being at an angle different from the angles of the cooperating sets of faces of the wedge and each of the remaining shoes; and a spring resistance opposing movement of the shoes lengthwise of the column.

16. In a friction shock absorbing mechanism, the combination with a wedge block having a series of at least three wedge faces, each of said faces being disposed at an angle to the longitudinal axis of the mechanism, the angles of said faces respectively of said series increasing progressively, one over the other; of a plurality of friction shoes surrounding said wedge, said shoes corresponding in number to the wedge faces of said wedge and each shoe having a wedge face engaging with and correspondingly inclined to one of said wedge faces of the wedge, said shoes and wedge together providing a friction clutch; a shell in which said clutch is slidable; and spring means resisting movement of said clutch inwardly of the shell.

17. In a friction shock absorbing mechanism, the combination with a wedge block having a series of three wedge faces, each of said faces being disposed at an angle to the longitudinal axis of the mechanism, the angles of said faces respectively of said series increasing progressively, one over the other; of three friction shoes cooperating respectively with the wedge faces of the wedge and each having a wedge face correspondingly inclined to and engaging the cooperating face of the wedge, said shoes having exterior friction surfaces; a friction shell enclosing said shoes and having interior friction surfaces engaged by the shoe friction surfaces; and a spring opposing movement of said shoes inwardly of the casing.

18. In a friction shock absorbing mechanism, the combination with a friction column; of a wedge having a wedge face disposed at a certain angle to the longitudinal axis of the mechanism, a second wedge face disposed at an angle to said axis which is greater than said first named angle, and a third wedge face disposed at an angle to said axis which is greater than said second named angle; three friction shoes interposed between said wedge and column, each having a wedge face correspondingly inclined to and engaging one of the wedge faces of said wedge; and spring means opposing movement of said shoes lengthwise of said column.

19. In a friction shock absorbing mechanism, the combination with a friction shell; of a wedge member having a wedge face inclined to the longitudinal axis of the mechanism at a certain angle, a second wedge face inclined to said axis at a keener angle than said first named wedge face, and a third wedge face inclined to said axis at a keener angle than said second named wedge face; a friction shoe having a wedge face engaging said first named face of the wedge and correspondingly inclined thereto; a second friction shoe having a wedge face engaging said second named wedge face of the wedge and correspondingly inclined thereto; and a third friction shoe having a wedge face engaging said third named wedge face of the wedge and correspondingly inclined thereto, said friction shoes having sliding frictional engagement within the shell; and a spring resistance opposing movement of said shoes inwardly of the shell.

HENRY FUCHS.